(12) United States Patent
Abrahami (10) Patent No.: US 10,169,307 B2
(45) Date of Patent: Jan. 1, 2019

(54) METHOD AND SYSTEM FOR THE USE OF ADJUSTMENT HANDLES TO FACILITATE DYNAMIC LAYOUT EDITING

(71) Applicant: Wix.com Ltd., Tel Aviv (IL)

(72) Inventor: Nadav Abrahami, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 589 days.

(21) Appl. No.: 13/779,798

(22) Filed: Feb. 28, 2013

(65) Prior Publication Data

US 2013/0232403 A1     Sep. 5, 2013

Related U.S. Application Data

(60) Provisional application No. 61/605,243, filed on Mar. 1, 2012.

(51) Int. Cl.
| | | |
|---|---|---|
| *G06F 17/21* | (2006.01) | |
| *G06F 17/24* | (2006.01) | |
| *G06F 3/048* | (2013.01) | |
| *G06F 17/22* | (2006.01) | |

(52) U.S. Cl.
CPC ........ *G06F 17/2247* (2013.01); *G06F 17/211* (2013.01); *G06F 17/24* (2013.01)

(58) Field of Classification Search
CPC .......... G06F 17/3089; G06F 17/30867; G06F 17/211; G06F 17/212; G06F 17/24
See application file for complete search history.

(56) References Cited

U.S. PATENT DOCUMENTS

| | | | |
|---|---|---|---|
| 5,570,281 A | 10/1996 | Berry | |
| 5,649,133 A | 7/1997 | Arquie | |
| 6,310,631 B1* | 10/2001 | Cecco et al. ................... | 715/792 |
| 7,634,725 B2* | 12/2009 | Nishikawa ...................... | 715/243 |
| 8,489,984 B1* | 7/2013 | Violet ........................ | G06F 8/34 |
| | | | 715/209 |
| 9,043,698 B2* | 5/2015 | Tucovic .................. | G06F 17/24 |
| | | | 715/246 |
| 2005/0108620 A1* | 5/2005 | Allyn .................. | G06F 3/04845 |
| | | | 715/255 |
| 2005/0177401 A1* | 8/2005 | Koeppel et al. ................... | 705/4 |
| 2007/0240039 A1* | 10/2007 | Hosotsubo ..................... | 715/517 |
| 2009/0249239 A1* | 10/2009 | Eilers ............................ | 715/769 |
| 2010/0325529 A1* | 12/2010 | Sun ..................... | G06F 3/04845 |
| | | | 715/234 |
| 2014/0095632 A1* | 4/2014 | Grosz .................. | G06F 3/1242 |
| | | | 709/206 |

\* cited by examiner

*Primary Examiner* — Ariel Mercado
(74) *Attorney, Agent, or Firm* — Heidi Brun Associates Ltd.

(57) ABSTRACT

A website editor implementable on a computing device. The editor includes an editing component to edit a website at least according to dynamic layout rules and smart handles to activate or to ignore the dynamic layout rules on the website.

15 Claims, 10 Drawing Sheets

METHOD AND SYSTEM FOR THE USE OF ADJUSTMENT HANDLES TO FACILITATE DYNAMIC LAYOUT EDITING

CROSS-REFERENCE TO RELATED APPLICATIONS

This application claims priority from U.S. Provisional Patent Application No. 61/605,243 filed Mar. 1, 2012 which is hereby incorporated in its entirety by reference.

FIELD OF THE INVENTION

The present invention relates to dynamic layout and the use of adjustment handles in particular.

BACKGROUND OF THE INVENTION

Current visual design systems use a WYSIWYG (What You See Is What You Get) metaphor to provide a convenient, high-productivity and easy to use environment for the creation and editing of graphical applications and creations. Such creations or applications can include web sites, catalogs, presentations, e-shops, flow diagrams and as well as other application categories. These creations are deployed to systems which display them on a display screen, or to systems which print them. Such visual design systems allow the designers (and sometimes the users) to resize and move components located in application pages.

A visual design system may integrate both static and dynamic content into the applications created in it. Static content may be stored locally and dynamic content may originate from a number of sources such as from the application itself, a database, an external dynamic data sources (or streams) such as a RSS feed or content generated by other users of the same system.

Visual design systems may be standalone systems (such as the MICROSOFT VISIO DIAGRAM EDITOR or the MICROSOFT POWER POINT PRESENTATION PROGRAM), or may be embedded inside a larger editing system (such as the MICROSOFT WORD AUTOSHAPE EDITOR).

A designer using such a system may design a new application from scratch (starting with a blank screen), or may rely on predefined templates created by the application designer, by the system creator, or by the designer community. When a template is provided, the designer can customize it at will, adding, removing or modifying all elements of the template to create his or her version of the template.

Such applications generally consist of multiple pages. An application can include any number of pages and pages can typically be added or removed by the system designer and/or the end-user as required. Pages contain components which can be further classified as either atomic (those that cannot be broken down into sub-components) or container (which occupy a given screen area and can contain one or more further sub-components). Components may be fixed in shape and content, may be based on a content management system or may be based on user specified content such as a text area into which the designer enters text. Dynamic components can be based on external information (static or dynamic), such as a RSS feed displaying information from an external data source or the content of a given internet page.

Container components can be nested to a number of levels and can contain components of multiple types. Some containers are also limited to contain specific classes of contained components such as a photo album container which may only hold picture components. Component appearances and screen areas can be modified by moving, resizing, rotation and similar operations. Their appearance and behavior can also be modified by various modifiers, such as blurring and animation (e.g. the component has blurred edges, or appears on the screen by expanding from a single pixel, etc.) During the application creation and editing process, the content of a component may be entered and modified in a number of ways.

In visual design systems, typically the pages (containing the components) as well as the components themselves (container and atomic components) are rectangles whose sides are parallel to each other and to the sides of the display screen. They are also parallel to the X and Y axes of the system on which the pages are being displayed or printed. In some cases, the components themselves are not axes-parallel rectangles. They may be a rotated rectangle, a combination of attached rectangles, or have a different shape altogether. In these cases, visual design systems (and their layout management element) typically handle the components using a per-component minimal enclosing axes-parallel rectangle which contains the irregularly-shaped component.

Components do not have to occupy mutually exclusive screen regions, and may in fact geometrically intersect each other. A component may also be situated completely within the boundaries of another component. The screen area overlap may be coupled with logical containment (i.e. the component "belongs" to a given container—and moves with the container wherever it goes), or be a mere geometrical overlap which is not based on any containment relationship. Whenever components intersect, a display priority attached to each component controls which component is displayed on top of which component. A visual design system typically employs a layout manager which manages component places, sizes, display order and related issues.

Visual design systems can be often be classified as absolute position or relative position systems (described in more detail herein below). In absolute positioning systems, the focus is on exact component positioning. The location of the components is defined as an absolute position value (x, y) relative to the containing entity, be it relative to the page itself or to a container containing the component. The position is typically expressed as an offset between the top left corner of the containing entity and the top left corner of the component.

In relative positioning systems, the focus is on the concept of flow or natural order. The system arranges components along a logical content flow, which typically corresponds to the reading order of the components whenever such an order is applicable. For example, an English language word processor is essentially a layout system for characters (and words) which uses the natural reading order of the English language (top to bottom and then left to right) to arrange the displayed characters and words. Another example is a blog editing system (such as the WORDPRESS blogging platform commercially available from wordpress.org), which arranges page elements (blog entries, talkbacks etc.) on a page according to a natural reading flow.

Thus, in a relative positioning system, the components are positioned relative to each other, so a component is displayed after (position-wise) the display of a previous component ends. Existing absolute and relative positioning systems both define a default screen or page size, which is used for all displayed pages. All relative positioning systems (and some absolute positioning systems) will increase this size as required to accommodate the addition of content to the page.

Figure 1:
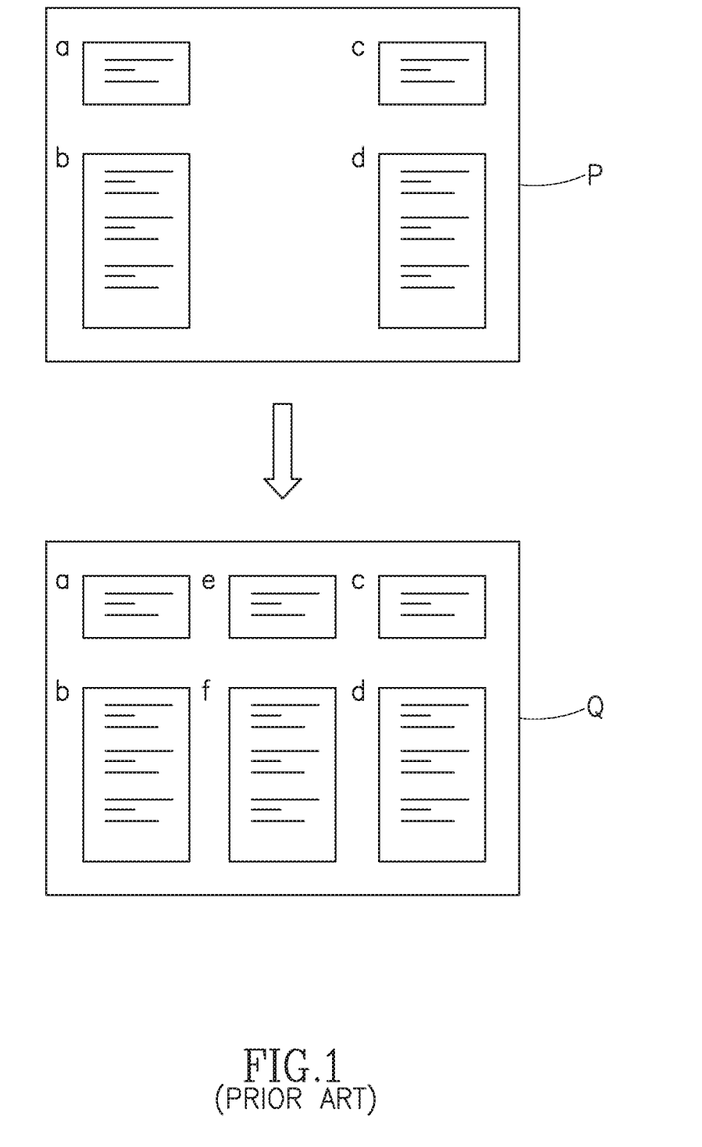
FIG. 1 is a schematic illustration of the use of absolute positioning in web page design.

Visual design systems which use absolute positioning are best suited for exact layout and design of the displayed page. Such exact placement allows components to be properly sized, positioned and aligned on the displayed screen. For example, as illustrated in FIG. 1 components [a], [b], [c] and [d] are arranged on a page P. Components [e] and [f] are then added in the available space (page Q), so that all are properly aligned—[a], [e] and [c] in the first row, and [b], [f] and [d] in the second row—without the need to push components aside or to calculate the correct reading flow.

There are also two main types of absolute positioning systems, constraint based systems and anchor-based systems. The types are not mutually exclusive and systems can contain elements of both systems. In visual design systems, constraints and anchors can be specified explicitly by the designer (through the system user interface) or inferred automatically by the system based on existing component layout and information. In a constraint-based system, the designer defines dynamic mathematical constraints on the relationships between the components residing on the screen. In anchor-based systems, the dynamic layout is defined in terms of anchors set between components and framework elements, as well as between the components themselves.

Dynamic layout, the automatic adjustment of components according to their content to fit on a page, is known in the art. In existing systems, dynamic layout is typically present in relative (rather than absolute) positioning systems. Current methods available provide both manual and automatic solutions using standard methodologies such as anchoring. Dynamic layout involves the moving and resizing of components on the screen based on dynamic layout triggers. These triggers may include content changes, multiple target platforms (display of the application using different technologies on different viewing platforms), multiple screen sizes (display of the application using a number of displays which have different sizes and resolutions), dynamic data (use of components containing dynamic data which changes over time), end user changes and application initiated layout changes.

Figure 2:
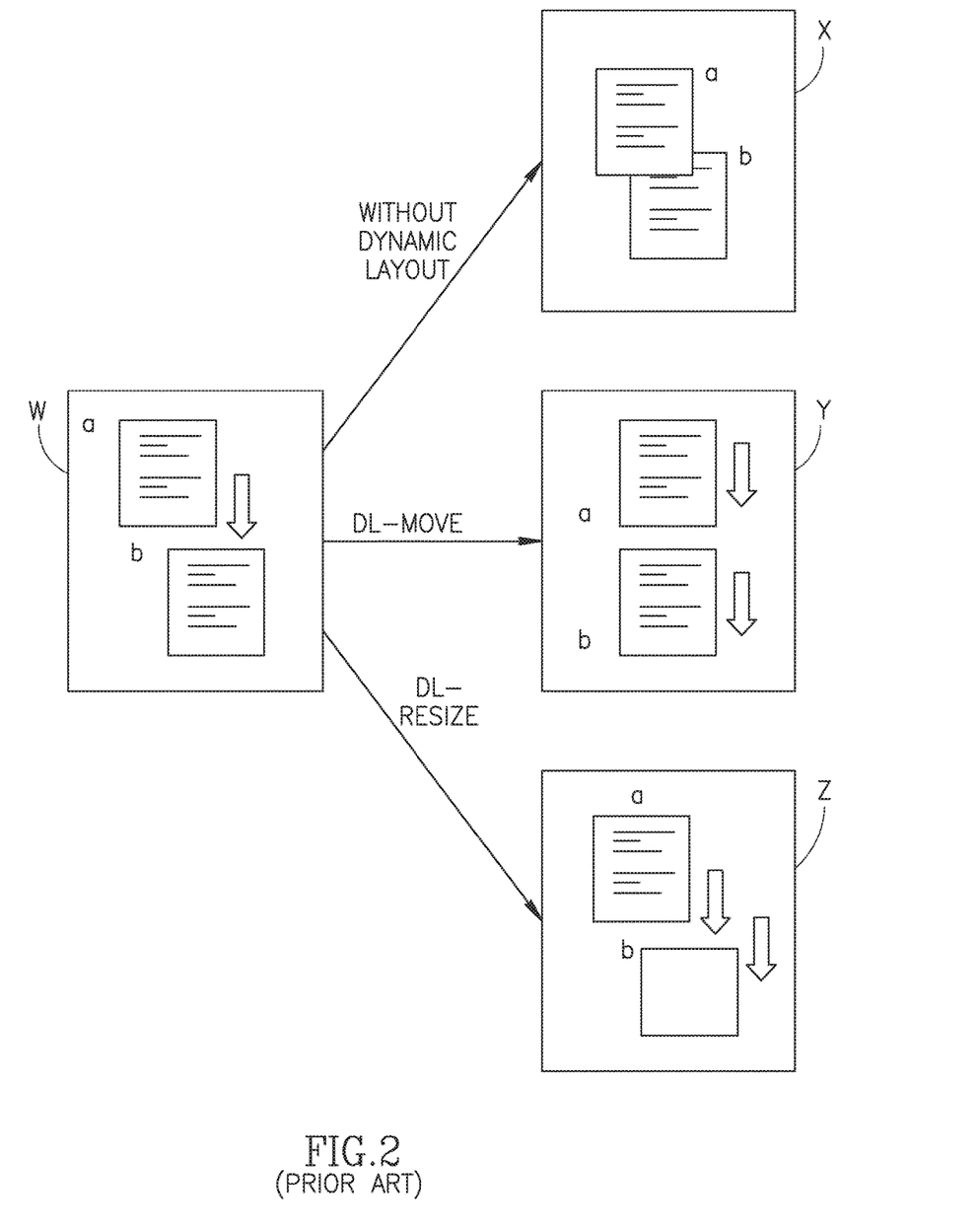
FIG. 2 is a schematic illustration of the use of dynamic layout during online editing.

Reference is now made to FIG. 2 which illustrates the implementation of dynamic layout on components [a] and [b] situated on a page W. As can be seen, component [a] is placed slightly above component [b] with a small separation between them. During editing, when component [a] is moved down, it begins to overlap and occlude component [b] as seen on page X. In such a scenario, it would be desirable to also move component [b] downwards accordingly in order to view the content of component [b] as is shown on page Y or to even resize it accordingly (i.e. shrink it), as shown on page Z, without losing sight of the content of component [b]. Such changes include not only modifications to the content of the displayed components ([a], [b]) but also modifications to their style and other display parameters, such as text size and font.

U.S. Patent Publication 2013/0219263 published Aug. 22, 2013, assigned to the common assignee of the present invention, describes dynamic layout and dynamic layout rules in more detail and is incorporated herein by reference.

SUMMARY OF THE PRESENT INVENTION

There is provided in accordance with a preferred embodiment of the present invention, a website editor implementable on a computing device. The editor includes an editing component to edit a website at least according to dynamic layout rules and smart handles to activate or to ignore the dynamic layout rules on the website.

Moreover, in accordance with a preferred embodiment of the present invention, the website editor also include a handle module to receive events triggered by changes made to the website elements according to at least one of the smart handles and a coordinator to coordinate dynamic layout updates according to the events and associated dynamic layout rules.

Further, in accordance with a preferred embodiment of the present invention, the website editor also includes a database to store elements of the website and the associated rules.

Still further, in accordance with a preferred embodiment of the present invention, the events include attribute and parameter values.

Additionally, in accordance with a preferred embodiment of the present invention, the smart handles are at least one of: a dynamic layout handle and a dynamic layout override handle.

Moreover, in accordance with a preferred embodiment of the present invention, the website editor also includes an interface device to display the smart handles.

Further, in accordance with a preferred embodiment of the present invention, the display of the smart handles is at least one of: designer defined according to the functionality of the smart handles and website editor defined according to functionality of the smart handles.

Still further, in accordance with a preferred embodiment of the present invention, the display of the smart handles is at least one of: invisible, transparent and a display construct of the web site editor.

Additionally, in accordance with a preferred embodiment of the present invention, the handle module includes a modifier to manually modify the display and the functionality of the smart handles using at least one of: a keyboard, a mouse and a touchscreen.

Further, in accordance with a preferred embodiment of the present invention, the updates include the manipulation of the website elements according to the events and the associated rules.

Moreover, in accordance with a preferred embodiment of the present invention, the rules define the relationships between the web site elements and at least one other secondary website element.

Further, in accordance with a preferred embodiment of the present invention, the relationships are at least one of explicit anchors, automatic anchors and semi-automatic anchors.

Still further, in accordance with a preferred embodiment of the present invention, website elements are at least one of a component and a framework.

There is provided in accordance with a preferred embodiment of the present invention, a method for editing a website, the method includes editing a website at least according to dynamic layout rules and activating or ignoring the dynamic layout rules on the website using smart handles.

Moreover, in accordance with a preferred embodiment of the present invention, the method also includes receiving events triggered by changes made to the website elements according to at least one of the smart handles and coordinating dynamic layout updates according to the events and associated dynamic layout rules.

Moreover, in accordance with a preferred embodiment of the present invention, the method includes storing the website elements and the associated rules in a database.

Further, in accordance with a preferred embodiment of the present invention, the events include attribute and parameter values.

Moreover, in accordance with a preferred embodiment of the present invention, the method also includes displaying the smart handles.

Additionally, in accordance with a preferred embodiment of the present invention, the displaying of the smart handles is at least one of: designer defined according to functionality of the smart handles and website editor defined according to functionality of the smart handles.

Moreover, in accordance with a preferred embodiment of the present invention, displaying of smart handles is at least one of: invisible, transparent and a display construct of the website editor.

Further, in accordance with a preferred embodiment of the present invention, the receiving includes modifying the display and the functionality of the smart handles using at least one of: a keyboard, a mouse and a touchscreen.

Still further, in accordance with a preferred embodiment of the present invention, the coordinating includes the manipulation of the website elements according to the events and the associated rules.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated, that in existing systems known in the art, there are often multiple and complex rules governing the application of dynamic layout. These can involve anchors or constraints specified by the designer, as well as those created automatically or semi-automatically by the system. A dynamic layout system excels at handling changes to a substantially complete application page, i.e. when local changes are applied to specific components and the designer would like to retain the general look and feel of the designed page, in particular when the design is substantially complete.

However, occasionally during page design, a designer may sometimes desire to make some sweeping changes to certain components—changes which could break the existing look and feel of the page design in order to create a new and better design. The situation may also be more complex—since there may be multiple pre-defined dynamic layout rules, and the designer may desire to modify a given component or set of components, activating some of the set dynamic layout rules and bypassing others.

Figure 3:
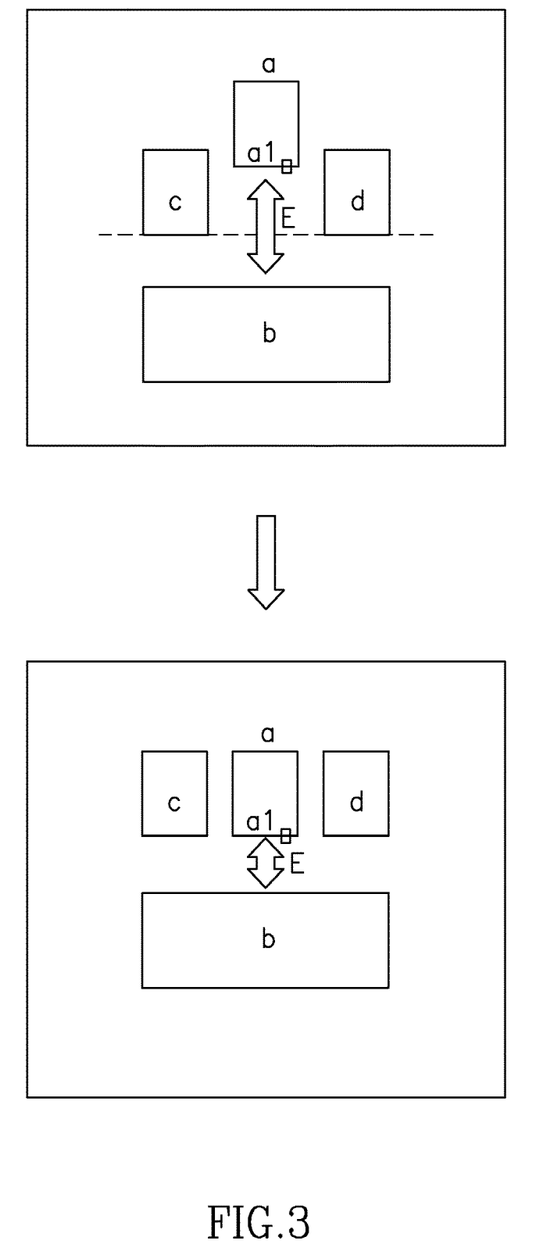
FIG. 3 is a schematic illustration of the use of specific handle to modify the distance specified for an existing anchor.

Reference is now made to FIG. 3 which illustrates two components [a] and [b] anchored together by anchor E so that moving component [a] downwards would also move component [b] down. The designer would like to move the lower edge a1 of component [a] to be aligned with the bottom edges of components [c] and [d] without affecting component [b].

Figure 4:
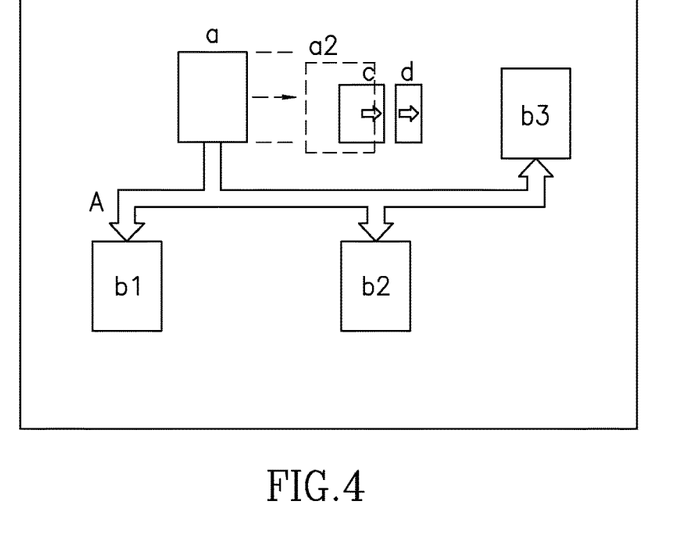
FIG. 4 is a schematic illustration of a specific handle to modify a complex, multi-component anchor.

Reference is now made to FIG. 4 which illustrates another example of a situation where the override of dynamic layout may be required. As is shown, component [a] is anchored to components [b1], [b2] and [b3] with anchor A. The designer would like to reposition component [a] to a new position (as shown by component [a2]) which differs in position both horizontally and vertically. The designer may also wish to keep anchor A intact without affecting or moving components [b1], [b2] and [b3] but may wish to move components [c] and [d] to the right.

It will be appreciated that often, a simple solution such as turning off dynamic layout during an editing session, does not provide a full solution to the range of exception to the rule scenarios, and many existing systems, do not provide this turn off option. Another simple solution—that of removing the anchors attached to the given component, editing the component and re-creating the anchors—might be extremely difficult to implement or use. Furthermore, some of the anchors may be automatic or semi-automatic and may not have been created by the designer himself making it more complicated for the designer to remove and restore them. In addition, this solution may become very labor intensive once components start to have numerous anchors attached to them.

Figure 5:
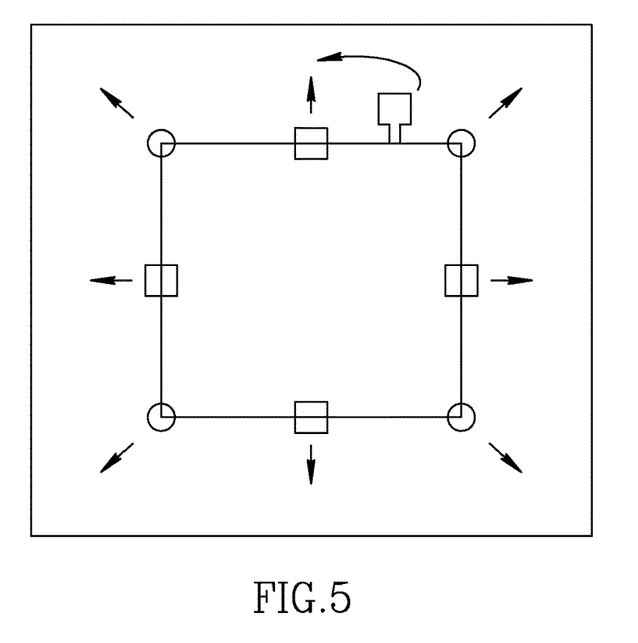
FIG. 5 is a schematic illustration of the use of adjustment handles for visual editing.
Figure 6:
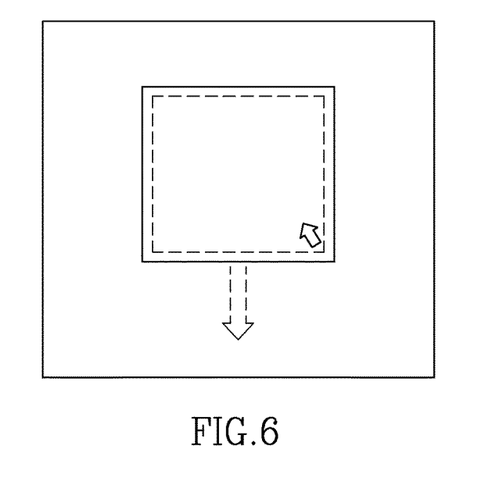
FIG. 6 is a schematic illustration of the use of the internal area of a component for position change.

It will also be appreciated that most visual design systems (and many other systems) use handles (also known as adjustment handles) as the main user interface device through which components are visually manipulated. Handles are typically provided in corners and/or edge centers of the components and allow for moving the components, resizing them and possibly rotating them as is illustrated in FIG. 5 to which reference is now made. Additional editing mechanisms may also be provided, such as (for example) a dialog box which allow for direct setting of a components' geometrical properties (such as height and width). These actions (move, resize and rotate) may sometimes be achieved using the non-handle regions of the component. In particular, many systems known in the art may allow component resizing by dragging any part of a component edge (e.g. table row and column resizing using the WORD program commercially available from MICROSOFT). Furthermore, many systems may allow a component to be moved by dragging any area inside the component as is illustrated in FIG. 6 to which reference is now made.

Applicants have realized that the use of multiple adaptable adjustment handles may be integrated with dynamic-layout rules to activate actions with different associated parameters. Applicants have further realized, that this may be of particular use in situations in which a single operation (such as "move component") may have multiple, widely divergent semantics due to the use of multiple, parameterized dynamic layout rules, and the combination of explicit and automatic anchors.

Figure 7:
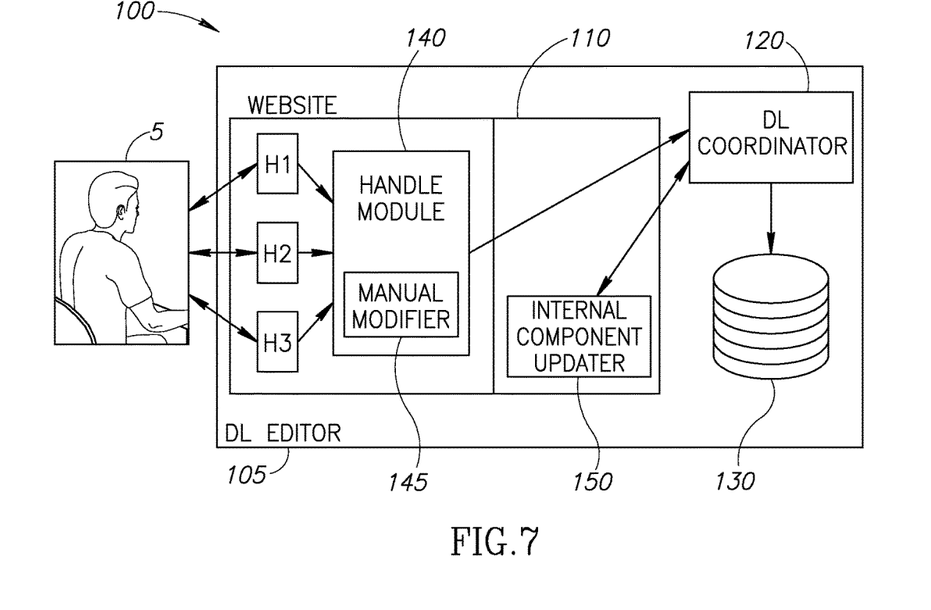
FIG. 7 is a schematic illustration of a system for using smart handles to trigger or to ignore dynamic layout rules for a particular component, constructed and operative in accordance with the present invention.

Reference is now made to FIG. 7 which illustrates a system 100 for using smart handles to trigger or to ignore dynamic layout rules for a particular component. For the sake of clarity, a web-based site editing system is used as an example of a visual design system. System 100 may comprise a dynamic layout editor 105 and a website 110. Dynamic layout editor 105 may comprise a dynamic layout coordinator 120 and a database 130. Database 130 may hold the dynamic layout rules associated with website 110, as well as information about the components, their content and their arrangement. Website 110 may comprise a handle module 140 and an internal component updater 150. Handle module 140 may comprise a manual modifier 145. It will be appreciated that website 110 may offer handles H1, H2 and H3 as part of its user interface to move and/or resize components. Handle module 140 may control the display of handles H1, H2 and H3 as well as interpret any changes made by a designer and/or a user to components via handles H1, H2 and H3. Manual modifier 145 may allow designer 5 to override the pre-defined display and/or functionality of handles H1, H2 and H3 as described in more detail herein below. It will be appreciated that system 100 may be installed locally or on a remote server accessed through a communication medium (as described in more detail herein below). For the sake of clarity, a system 100 installed locally is discussed.

User 5 may decide to manually adjust the size, shape or position of a particular component X using the available handles (H1, H2 and H3) provided by website 110 for component X. Handle module 140 may receive any changes made by user 5 using handles H1 and H2 and may pass this information to dynamic layout coordinator 120. It will be appreciated that a handle triggered event may include actions associated with a single handle or with multiple handles. Dynamic layout coordinator 120 may then check within database 130 to see if there are any dynamic layout rules pertinent to component X such as anchoring to a nearby component. Dynamic layout coordinator 120 may then inform internal component updater 150 of any pertinent changes to be made to component X and/or any other components. Internal component updater 150 may then execute the required adjustments. It will be appreciated that handle H3 may be a dynamic layout override handle and therefore may not trigger any visible dynamic layout activity but may still cause internal dynamic layout activity such as changing the length of an anchor etc. Handle H3 may therefore allow for a component to be moved or resized, without affecting any neighboring components.

It will be appreciated that there may be two possible conventions for using smart handles in conjunction with dynamic layout rules. The first is dynamic layout by default in which the regular adjustment handles provided for the components act as triggers for dynamic layout activity. Separate handles may also be provided that purposely bypass the dynamic layout triggering either completely or for specific anchors and/or rules. The second convention is no dynamic layout by default. In this scenario, regular handles do not trigger dynamic layout events and specific handles are provided that do trigger dynamic layout events. A combination of both conventions may also be used.

It will be further appreciated that a designer may differentiate between the various different handle types as discussed hereinabove using any type of visual attribute (such as shape, color or animation), their position on the edge component in question or via a pop up message or graphics symbol which may pop up as the mouse approaches the handle area. It will be also appreciated that handles may be invisible or virtual having different display methods such as using a specific area (internal or external to the actual component area) as a handle, using part of another control structure (such as the component boundary) to provide an additional handle function, and using another area or component element as above and having the area change some visual property upon mouse approach, mouse over or mouse click.

Figure 8:
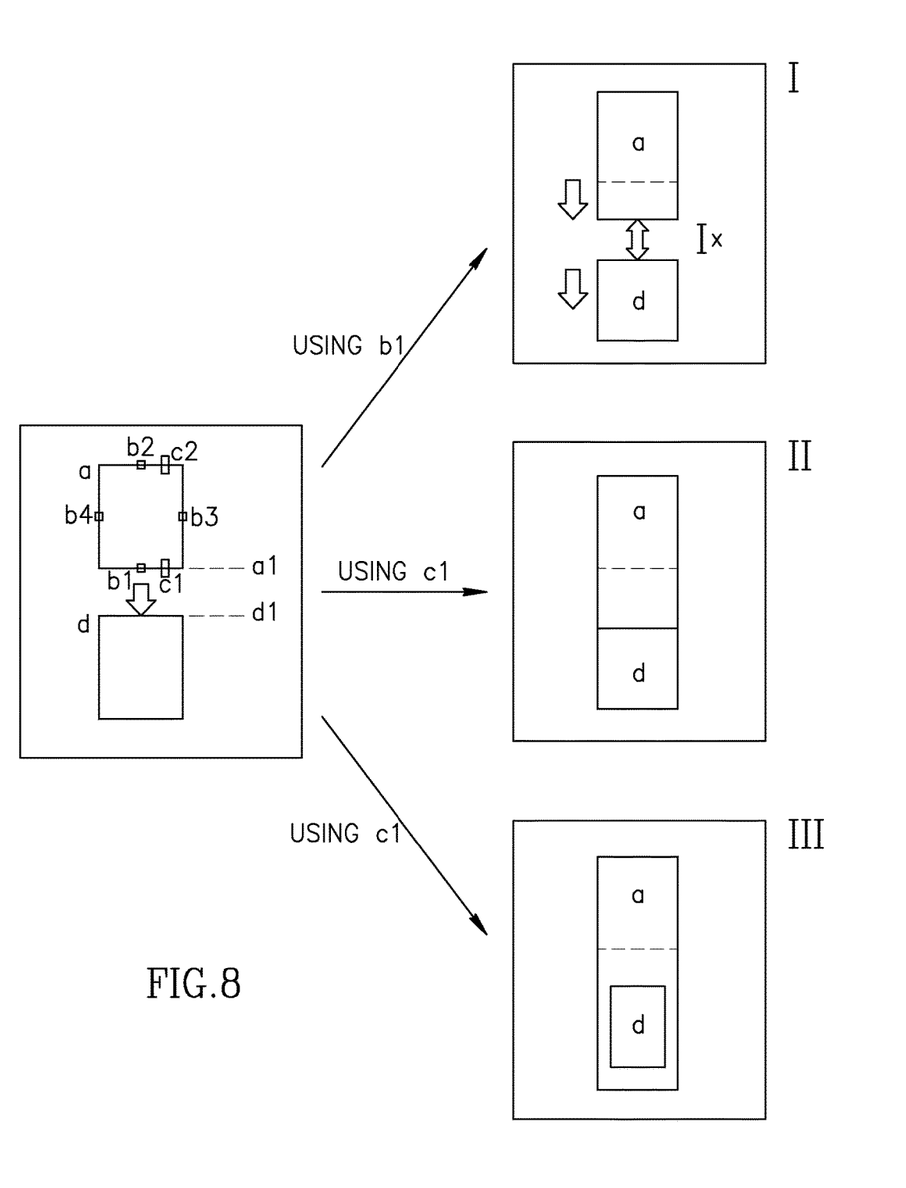
FIG. 8 is a schematic illustration of the use of multiple handles to enable or disable dynamic layout use for automatic anchoring, constructed and operative in accordance with the present invention.

It will be appreciated that visual editing systems typically provide specific handles for the main design functions such as moving and resizing. Therefore in order to control an automatic anchor, a different handle may be provided for each desired function which may override any dynamic layout rules and be outside the rules. Reference is now made to FIG. 8 which illustrates an example of dynamic layout by default convention for automatic anchors. Component [a] has four regular sized handles b1 (down), b2 (up), b3 (right) and b4 (left). Component [a] may also have additional down/up dynamic layout override resize handles c1 (down) and c2 (up), which only appear in the specific directions in which dynamic layout is available i.e. where component [a] may have an automatic anchor. In scenario I, when component [a] is extended downwards, using regular handle b1, system 100 may be triggered, creating an automatic anchor between a1, the lower edge of component [a] and d1, the upper edge of component [d], once the distance between a1 and d1 becomes smaller than a threshold value x. When this happens, component [a] may push component [d] downwards to make space for the expansion of component [a]. In scenarios II and III, resize handle c1 is used instead of the regular handle b1, thus overriding any preset dynamic layout rules and allowing for component [d] to remain in the same position whether component [a] is resized downwards towards component [d] (scenario II) or overlaps component [d] completely (scenario III).

Figure 9:
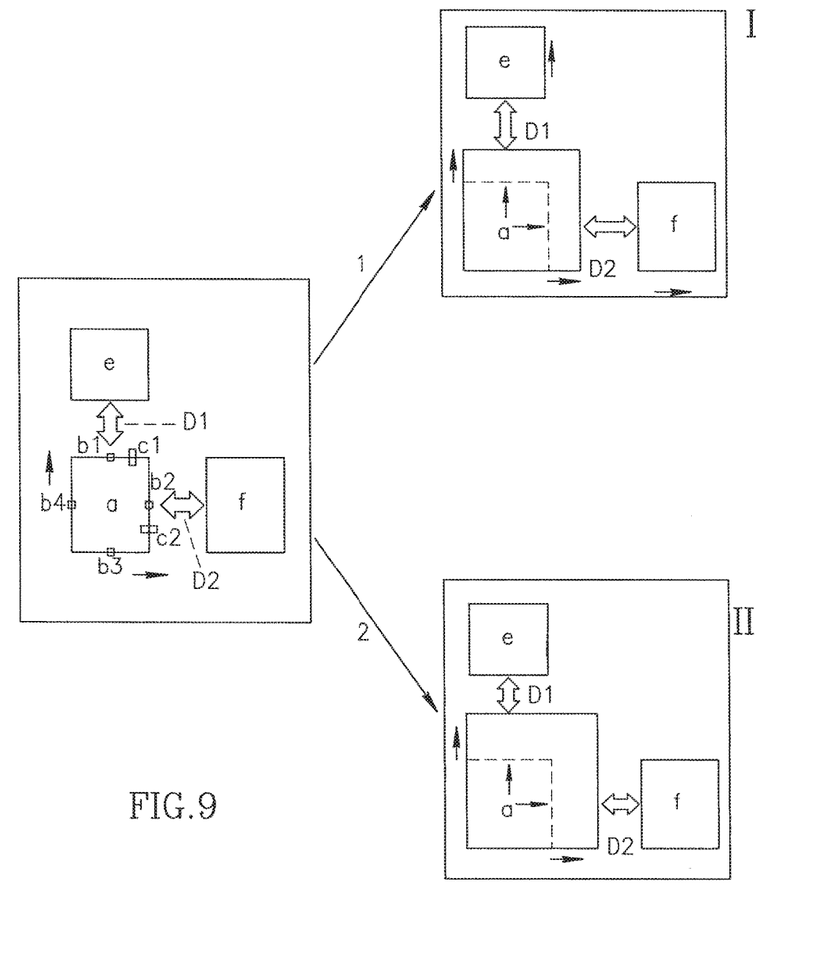
FIG. 9 is a schematic illustration of the use of multiple handles to enable or disable dynamic layout use for explicit anchoring, constructed and operative in accordance with the present invention.

Explicit anchors may be handled in a similar manner. It will be appreciated that explicit anchors are permanent until removed by the designer. The additional adjustment handles may only appear on the edges which have explicit anchors and not on the edges that do not. Reference is now made to FIG. 9 which illustrates an example of dynamic layout by default convention for explicit anchors. Component [a] has regular resize handles (b1, b2, b3, b4) on all four edges but has dynamic layout override resize handles c1 and c2 only on the top and right edges to which the explicit anchors are connected. In scenario I, a resize of component [a] upwards or to the right using handles b1 or b2, may activate explicit anchors D1 and D2 (respectively) and may move components [e] and [f] accordingly. In scenario II, a resize using handles c1 and c2 may resize component [a] without affecting components [e] and [f].

Figure 10:
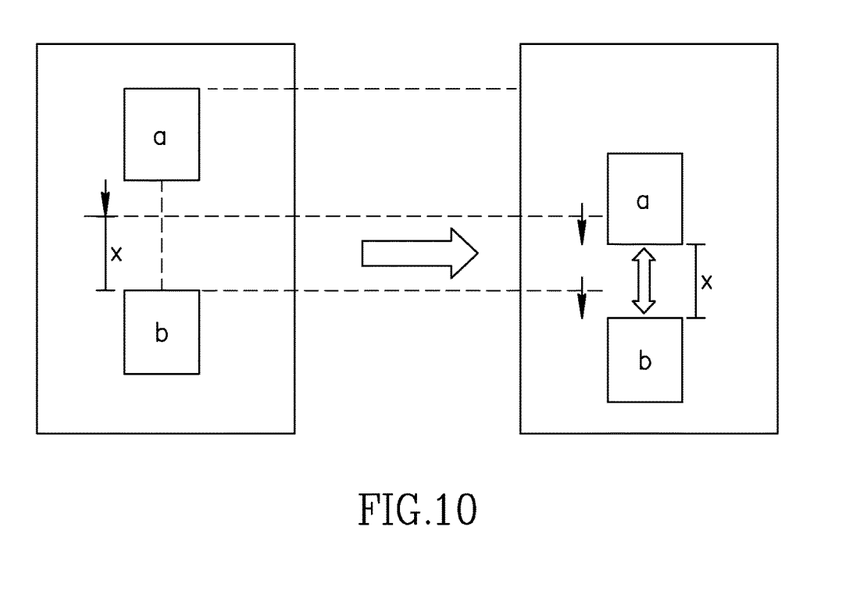
FIG. 10 is a schematic illustration of proximity-based automatic anchor creation, constructed and operative in accordance with the present invention.
Figure 11:
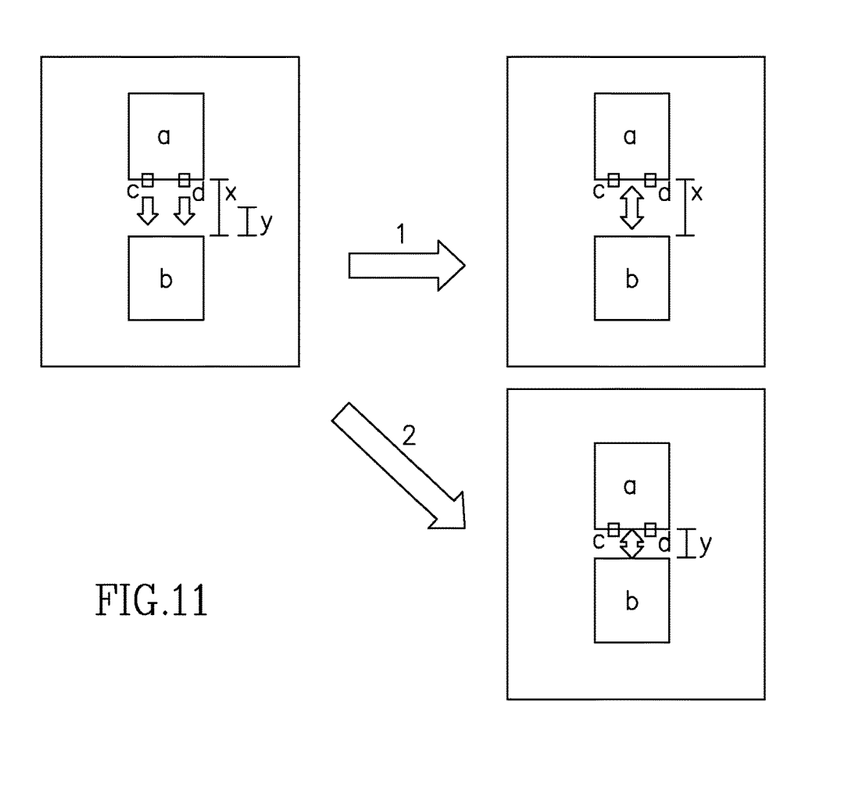
FIG. 11 a schematic illustration of the use of multiple handles to specify different proximity thresholds for proximity-based automatic anchor creation, constructed and operative in accordance with the present invention.

It will be appreciated, that website 110 may display multiple handles which may cause system 100 to use different parameters values for the same layout rules. Reference is now made to FIG. 10 which illustrates a dynamic layout rule in which component [a] is moved and reaches a distance of less than X pixels from component [b], creating an automatic anchor between components [a] and [b] and pushing component [b] downwards accordingly. However website 110 may provide two different types of handles (c and d) for dealing with component [a] as is illustrated in FIG. 11 to which reference is now made. When handle c is used to move the bottom edge a1 of component [a] downwards as is illustrated in scenario I, the value of X is used as the distance threshold. Likewise, when handle d is used, the value of Y is used as the distance threshold. In this manner, the designer may move components around and enjoy the benefits of dynamic layout during editing and easily create area where components are densely situated amongst each other or are widely spaced apart. These may be achieved without having to switch between system modes, or perform multiple per-component or per anchor setting changes during editing.

It will be appreciated that different handles may be employed by website 110 to control whether dynamic layout rules are to be activated or not and that the rules themselves may vary from handle to handle. It will be further appreciated that handles may be assigned for specific rules or groups of rules. Handles may also be assigned which deactivate or override existing rules or groups of rules. It will be further appreciated that a user or designer may map handles to rules at different levels such as at the entire system level, at a specific application level (such as part of the application creation information) or even at page, container, component or component class level. Handles may also be automatically configured by system 100 via handle module 140 based on which rules are applicable to a particular component based on the type and position of the component within a page as well as according to existing anchors, nearby components or any other criteria. Handles may also be automatically configured based on the history of the use of rules and/or handle types by a specific user. For example, system 100 may provide rules for dynamic layout of horizontal edges and the dynamic layout of vertical edges. Two types of handles may be provided. The first type may allow the movement of a component while taking all rules into account including both horizontal edge and vertical edge anchors. The second type may allow the movement of a component while taking into account horizontal edge rules only and ignoring the vertical edge rules. Thus a designer may move a component around, activating all relevant rules which affect horizontal edges and individually determining which vertical edge rules to use. The functionality of handles may also be reconfigured manually by designer 5 using a keyboard, mouse or touch screen. In this scenario, manual modifier 145 may override the pre-defined functionality for the pertinent handle as held in handle module 140.

Figure 12:
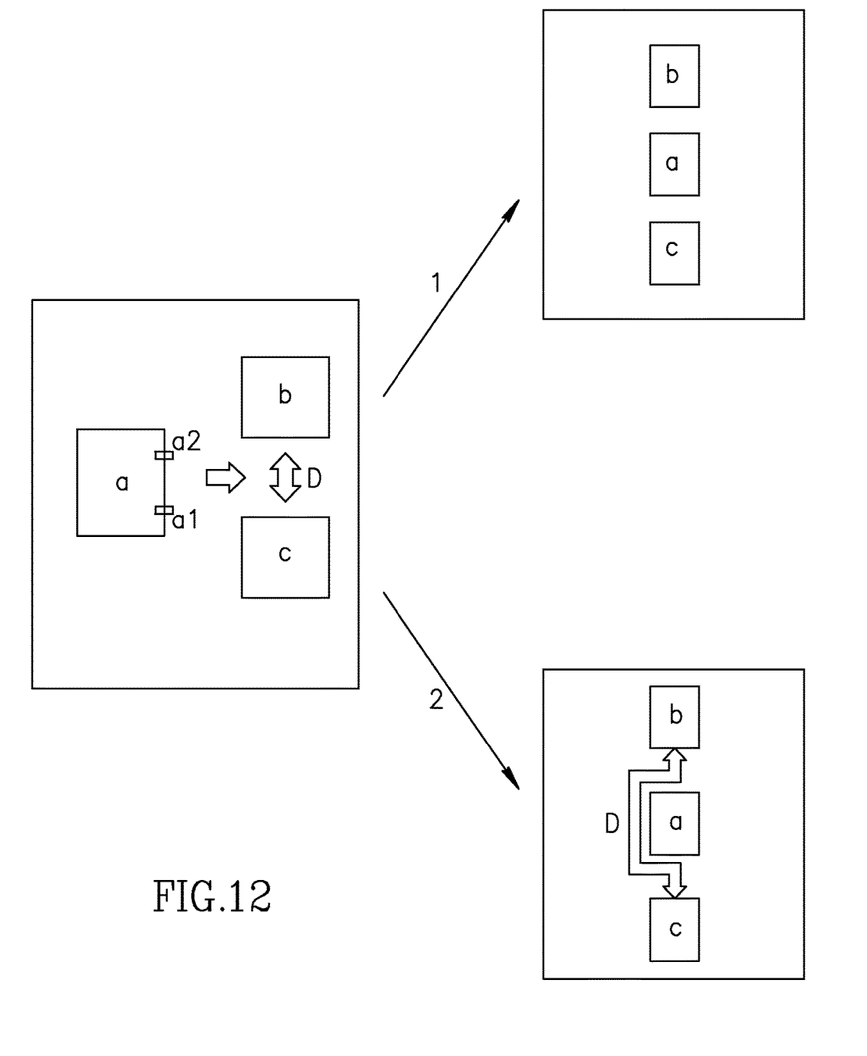
FIG. 12 is a schematic illustration of the use of multiple handles to control an explicit anchor breaking rule, constructed and operative in accordance with the present invention.

Reference is now made to FIG. 12 which represents a component [a] that has been moved between components [b] and [c]. Components [b] and [c] are anchored together by anchor D. In scenario I, component [a] is moved using handle a1, thus breaking anchor D. In scenario II, component [a] is moved using handle a2 and anchor D is not broken.

It will be appreciated that visual editing systems sometimes allow an end-user (rather than the designer) to perform limited layout editing operations by directly manipulating the size and/or the position of some of the components, thus requiring dynamic layout adjustment during run-time to compensate for user changes. It will be further appreciated, that website 110 may display different sets of handles to designers and end-users. For example, system 100 may provide handles which bypass dynamic layout (completely or just specific rules) for designer use and only regular dynamic layout handles to end-users. System 100 may provide handles to all components for designers and only to specific components for end-users. System 100 may also provide a set of handles with specific parameters to designers and a set of handles with different, more limiting parameters to end-users.

It will also be appreciated that if multiple adjustment handles are provided to a particular component, the visual overload may become too large, in particular for small components or small component edges which may have insufficient space for multiple handle attachment. One way of reducing the number of required handles may be through the use of multiple handle selection. In this mode of use, each handle may have a different specific function. The designer may desire to use the functions mapped to multiple handles and apply them to a single operation performed on the component such as moving or resizing it. This may be achieved by performing a multiple selection operation to perform multiple selection among the handles available on a given specific component or component edge. The use of multiple handle selection, may allow (for example) three handles to represent seven different function combinations ($7=2^3-1$).

It will also be appreciated that the number of handles in use may be reduced by dynamically displaying only the most relevant handles. An example of this (as described herein above) is a resize handle which affects explicit anchors being displayed only for edges which have such explicit anchors. Other criteria may be used to reduce handle display such as handles displayed based on rules applicable for a given component based on the component type, position, neighboring components etc. Handles may also be displayed according to their history of use, for example handle types used more recently by a designer would have a higher priority than those rarely used. For all the above mentioned cases, a display priority may be assigned and only handles with the higher priorities are displayed.

An alternative method of reducing the number of handles displayed is the use of a mouse, keyboard or screen gestures in conjunction with the use of specific handles in order to move/remove them. Examples may include handle dragging while holding down a given keyboard key to change the handle's function and handle dragging while holding down a mouse key for a mouse equipped with additional control keys. Other examples may include but are not limited to dragging a component or edge using a touch screen and performing a preliminary click on any screen modifier area or button with the effect being either continuous (until pressed again) or limited to the predefined dynamic layout operation performed right after the preliminary click. It will be appreciated that manual modifier 145 may perform this manual override of the handle display parameters held in handle module 140.

It will be appreciated that the implementation of multiple handles may be performed using handle module 140 in conjunction with website 110. It will be appreciated that the handles may be created using the different definitions as in described hereinabove such as handles mapped to specific dynamic layout rules, handles which depend on the existence of specific anchor types, handles defined by the user and mapped to given dynamic layout rules and handles based on user handle use history. Handle module 140 may instruct website 110 to display all applicable handles. Handle module 140 may also instruct website 110 to display a narrower set of handles according to different priorities as described hereinabove. It will be appreciated that the display of handles may be suppressed altogether (for handles which are completely invisible or virtual) or may be conditional based on mouse position etc.

Figure 13:
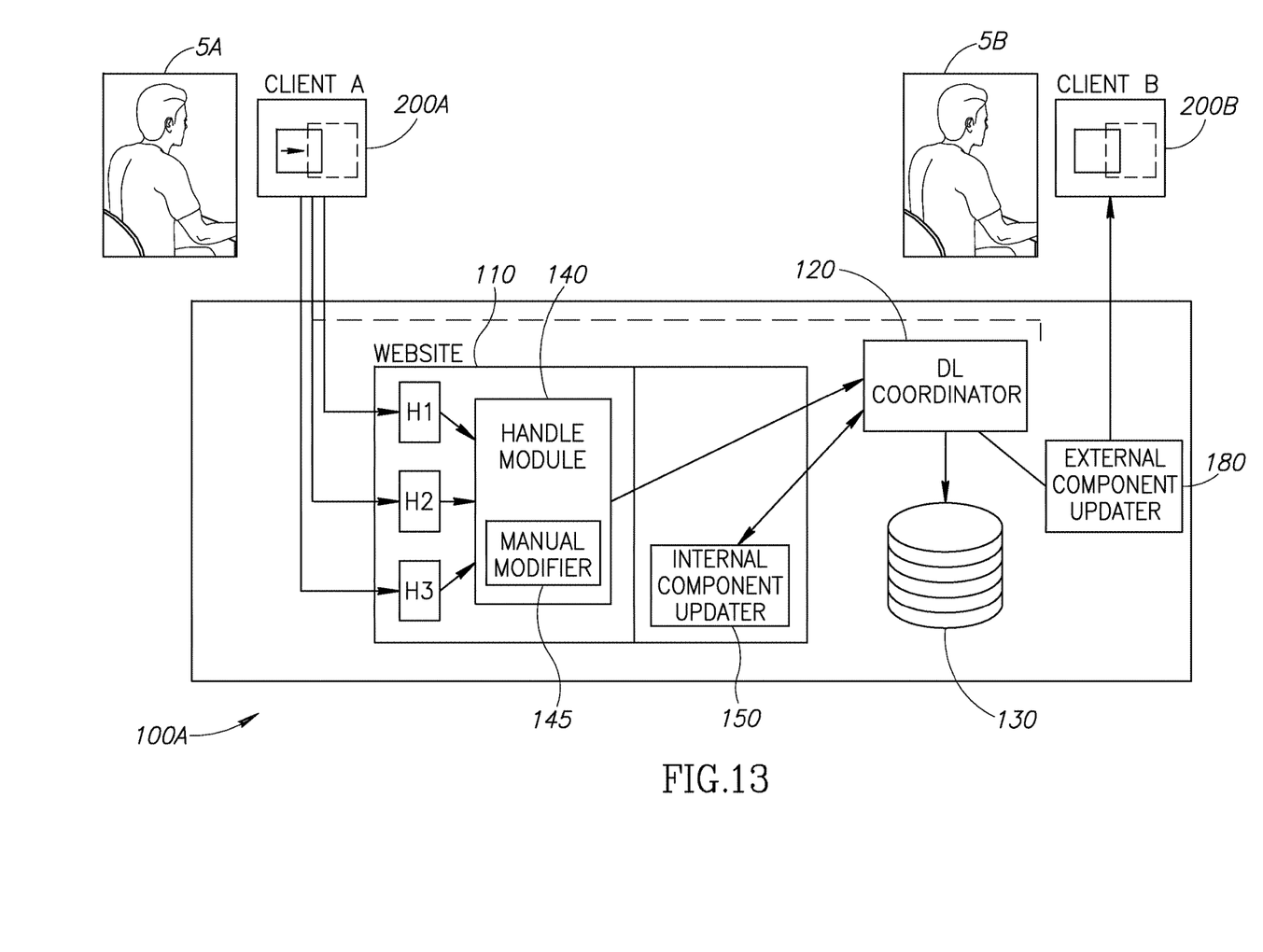
FIG. 13 is an alternative embodiment to the installation of the system of FIG. 7, constructed and operative in accordance with the present invention.

In an alternative embodiment to the present invention, system 100 may be installed on a remote server which may allow website 110 to be accessible to more than one user concurrently. It will be appreciated that user 5A working on client 200A may use handle H1 to trigger a dynamic layout event that may require not only an update for a particular component on his screen but also to the screen of client 200B which user 5B may be viewing. Reference is now made to FIG. 13 which illustrates system 100A, an alternative embodiment to system 100 for using smart handles to trigger or to ignore dynamic layout rules for a particular component. In this scenario it will be appreciated that dynamic layout coordinator 120, may instruct internal component updater 150 to update component X locally on client 200A and also instruct external component updater 180 to update component X displayed on client 200B. It will also be appreciated that system 100 may be integrated with a larger software system (such as Facebook) so as to provide a rich media application for editing, layout and display services inside that larger software system.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.)

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A website building system comprising:
    a database to store elements of a website, wherein a plurality of said elements have associated dynamic layout rules which define the relationships between one website element and at least one other secondary website element and wherein each element of said plurality of elements has at least one handle set, said set comprising at least first and second smart handles having different visual attributes;
    a dynamic layout editor to provide at least one of said website elements being edited with said at least one handle set during an editing session, said first smart handle to not implement an associated dynamic layout rule implemented by said second smart handle;
    a handle module to receive an event triggered by changes made to said at least one website element;
    an updater to update said at least one website element according to said event, handle set, handle type and associated dynamic layout rules when not bypassed by said first smart handle and to display said at least one updated website element during said editing session; and
    a processor and a memory unit, said processor to embody said dynamic layout editor, said handle module and said updater.

2. The website building system according to claim 1 and wherein said event comprises attribute and parameter values.

3. The website building system according to claim 1 and wherein said smart handles are at least one of: a dynamic layout handle and a dynamic layout override handle.

4. The website building system according to claim 1 and wherein said user interface displays said smart handles.

5. The website building system according to claim 4 and wherein said display of said smart handles is at least one of: designer defined according to the functionality of said smart handles and website editor defined according to said functionality of said smart handles.

6. The website building system according to claim 4 and wherein said display of smart handles is at least one of: invisible, transparent and a display construct of said website editor.

7. The website building system according to claim 1 and wherein said handle module comprises a modifier to enable manual modification of said display and said functionality of said smart handles using at least one of: a keyboard, a mouse and a touchscreen.

8. The website building system according to claim 1 and wherein said relationships are at least one of explicit anchors, automatic anchors and semi-automatic anchors.

9. The website building system according to claim 1 wherein said website elements are at least one of a component and a framework.

10. A method for an online website building system, the method comprising:
   storing in a database elements of a website, wherein a plurality of said elements have associated dynamic layout rules which define the relationships between one website element and at least one other secondary website element and at least wherein each element of said plurality of elements has at least one handle set, said set comprising at least first and second smart handles having different visual attributes;
   providing a dynamic layout editor for editing of said at least one website elements during an editing session, said providing comprising providing at least one of said website elements being edited with said at least one handle set, said first smart handle to not implement an associated dynamic layout rule implemented by said second smart handle;
   receiving an event triggered by changes made to said at least one website element; and
   adjusting said at least one website element according to said event, handle set, handle type and associated dynamic layout rules when not bypassed by said first smart handle and to display said at least one updated website element during said editing session.

11. The method according to claim 10 and wherein said events comprise attribute and parameter values.

12. The method according to claim 10 and also comprising displaying said smart handles.

13. The method according to claim 12 and wherein said displaying of said smart handles is at least one of: designer defined according to the functionality of said smart handles and website editor defined according to said functionality of said smart handles.

14. The method according to claim 12 and wherein said displaying of smart handles is at least one of: invisible, transparent and a display construct of said website editor.

15. The method according to claim 10 and wherein said receiving comprises modifying said displaying and said functionality of said smart handles using at least one of: a keyboard, a mouse and a touchscreen.

* * * * *